United States Patent [19]

Kubo et al.

[11] 4,208,262

[45] Jun. 17, 1980

[54] ELECTRODEPOSITION COATING

[75] Inventors: Akira Kubo, Sakura; Nobuaki Todoroki, Warabi; Yasuhiko Teshima, Yachiyo; Nobuo Kuranami, Narashino; Nobukazu Tsutsui, Kawanishi; Akio Kasai, Sayama, all of Japan

[73] Assignees: Shinto Paint Co. Ltd., Amagasaki; Honda Motor Co. Ltd., Tokyo, both of Japan

[21] Appl. No.: 37,853

[22] Filed: May 10, 1979

[30] Foreign Application Priority Data

May 11, 1978 [JP] Japan ................................ 53-56009
May 11, 1978 [JP] Japan ................................ 53-56010

[51] Int. Cl.² ...................... C25D 13/06; C25D 13/22
[52] U.S. Cl. ................................................ 204/181 T
[58] Field of Search ...................... 204/181 C, 181 T

[56] References Cited

U.S. PATENT DOCUMENTS

| 3,681,224 | 8/1972 | Stromberg | 204/181 T |
| 4,136,070 | 1/1979 | Hazan | 204/181 T |

Primary Examiner—Howard S. Williams
Attorney, Agent, or Firm—Wenderoth, Lind & Ponack

[57] ABSTRACT

A process for coating an article is provided herein, which process comprises subjecting an article to a powder electrodeposition in a bath containing a water-thinnable cationic synthetic resin and a synthetic resin in the form of a fine powder, and then subjecting the thus coated material, without hardening the formed coating, to an additional electrodeposition in a bath containing an ionic synthetic resin and baking the coated article to effect cross-linking and hardening between the resins; the improvement step which is characterized in spraying hot water of more than 50° C. onto the coated film after finishing the first half powder electrodeposition, but before carrying out the second half electrodeposition step.

2 Claims, 2 Drawing Figures

ELECTRODEPOSITION COATING

BACKGROUND OF THE INVENTION

This invention relates to an improvement in the method for coating an electrically conductive article wherein the article to be coated is used as a cathode and is coated by an electrodeposition in an aqueous bath containing a synthetic resin in the form of fine powder and a water-thinnable cationic synthetic resin and subsequently in an aqueous bath containing an ionic synthetic resin.

DESCRIPTION OF THE PRIOR ART

As a method for coating an article, the so-called powder coating method has been well known and widely used. However, such method has many drawbacks such as possible dust explosion, malignant effect on health due to dust aspiration and the like. In order to overcome the abovementioned problems, the so-called electrodeposition or electrocoating has been developed recently.

In the abovesaid electrodeposition method, an article to be coated is used as a cathode and is coated by electrodeposition in an aqueous bath containing as main ingredients a synthetic resin in the form of fine powder and a water-thinnable cationic synthetic resin (hereinafter called as powder electrodeposition coating method). This powder electrodeposition coating method can overcome the abovementioned drawbacks of the powder coating and moreover, can afford additional effects of improving some other defects of the latter. For example, in the powder coating method, it is unavoidable to have the flow down of the powder particles at the coated surface, which will cause unevenness in the thickness of the coated film thus formed. However, in the electrodeposition method, such unevenness cannot be found out. Furthermore, since the powder deposition is based on an electrodeposition, this method has an advantage capable of coating a larger area in a comparatively shorter period of time. The powder electrodeposition coating has also such advantage that 2 to 3 times thicker coating can be obtained in a defined period of time as compared with those of conventional electrodeposition coating methods.

However, the coated film thus obtained is, under wet condition, of porosity due to the inclusion of synthetic resin fine powder and of low electric resistance, though having a higher Coulomb efficiency as compared with that of conventional electrodeposition with ionic synthetic resin. Therefore, there is a drawback of being inferior in the deposition amount per unit time when compared with the case of conventional electrodeposition. This may cause additional question of unsatisfactory rust-resistance when the coating is to be applied for anticorrosive purpose.

It has been proposed to conduct an electrodeposition in a bath containing a resinous powder, and subsequently, without hardening the coated film, carry out the second electrodeposition in a bath containing as a main ingredient an ionic synthetic resin. According to this method (hereinafter called as wet-reverse coating system), the abovementioned drawbacks are solved out and therefore, various articles for which rust-resistant and anticorrosive coatings are to be applied, for example, automobile body member, automobile parts, interior and exterior electric machineries, tools and parts thereof, common construction materials, road marks, outer coating of box-type, built-up metal parts and the like are advantageously treated by this method.

According to this method, it is possible to apply a powder electrodeposition coating to the outer surface of box-type, built-up metal parts with a thicker coating of improved rust-resistance and anticorrosion and a conventional electrodeposition is then applicable to the inner surface which is less important for anticorrosion of said parts to obtain a coated film with standard thickness (20 to 30 microns). In this case, since there is no need of interposing a film hardening step between the abovementioned both coating operations, i.e. the second half electrodeposition is carried out on the powder electrodeposition coated film without hardening the same, there is a distinct advantage of having no discontinuity of thus formed films. If the coated film obtained by the first half powder electrodeposition is subjected to hardening, a comparatively higher electric resistance is developed, even at the thinner portion, in the subsequent electrodeposition operation because of said hardening and no satisfactory electrodeposition is occurred, thereby giving inferior anticorrosive and rust-resistant area at the same portion (often resulted in 2 to 5 microns thickness film). Therefore, preference is given to the case wherein the second half electrodeposition is carried out without prehardening the powder electrodeposition coated film. However, in such a wet-reverse system, the powder electrodeposition/electrodeposition composite coating may sometime result a partial but excessively thicker coating depending on, for example, shape and stationing of the article to be coated, variation of bath with time, ionic contamination of bath or other outer factors, thereby causing undesirable popping and surface roughening thereof.

Therefore, an object of the invention of this application is to solve out the abovementioned drawbacks possessed by the wet-reverse system.

SUMMARY OF THE INVENTION

The present invention provides a process which is characterized by that at the middle stage between the powder electrodeposition and electrodeposition of said wet-reverse system, a hot water of at least 50° C. is sprayed onto the film surface formed by the said first half powder electrodeposition coating. According to the method of this invention, by the adoption of said hot water spraying, the deposited resins are fused together to form an adherent, insulating film which will control an excessive electrodeposition in the subsequent electrodeposition step.

DETAILED DESCRIPTION OF THE INVENTION

Figure 1:
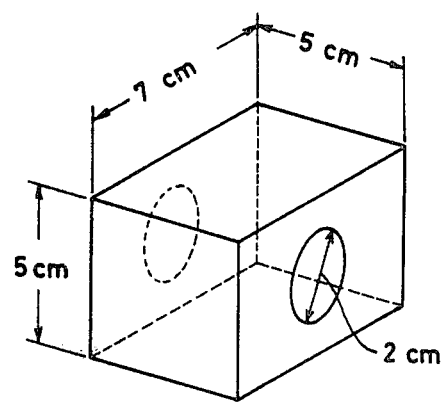
FIG. 1 represents a box-type article to be electrocoated according to the present invention which article has a perforate of 2 cm in diameter going through a pair of opposite sides.

The abovesaid spraying may be carried out, after finishing a water wash of the powder electrodeposition coated film or as the last step of said water wash, by applying a hot water through a riser-nozzle or a spraying gun, or in some cases, the coated article may be dipped into a hot water. The higher the temperature of said hot water, the more the fusing effect and therefore, the lesser the formation of additional film in the second electrodeposition. However, since there are fusing effect of the binder resin containing an organic solvent in the coated film and dissolving effect of the binder resin with reduced viscosity into the resin powder, the said temperature needs not always be as high as melting point of the synthetic resin contained in the resinous powder, but the desired effect is obtainable with a hot water with a lower temperature than the same.

One of the critical factors is to bring the coated article to a high temperature with said hot water, and therefore, an excessively atomized spraying is unadvisable. Furthermore, the more the sprayed amount the larger the heating effect.

Spraying amounts, method and water temperature may be determined depending on the shape of article to be coated, degree of finish desired, and economical standview.

After completion of said water wash and subsequent hot water spraying, thus treated coating is, without hardening the same, subjected to an electrodeposition in an aqueous bath containing an ionic synthetic resin, and thereafter, to a water washing, if necessary, drain drying and baking to form a tough, cross-linked, coated film.

In one aspect of the invention, the coated film obtained in the first half powder electrodeposition coating is, after washing and hot water spraying, subjected to drying to evaporate the volatile components to the content of less than 15% by weight, and then to the subsequent electrodeposition to obtain a smooth, beautiful coating. That is, the coated film obtained in the first powder electrodeposition contains about 30 to 45% by weight, in some case as high as 50% by weight, of volatile component mainly of water, and therefore, there occurs various operational difficulties when subjected directly to the subsequent electrodeposition. For example, when the coated article is allowed to stand for a certain period of time before subjecting to the second half electrodeposition, for example 60 minutes and more, a detectable amount of rust may happen to occur on the metal surface underlying the powder electrodeposition coating. On the other hand, when the coated article is immediately subjected to the subsequent electrodeposition by line entry system, an electrodeposition coating will be deposited on the first powder electrodeposited coating following the so-called hash marks (band streaks in horizontal direction) thereby spoiling the evenness of the coated film. Furthermore, in some cases, a partial flow-down of the deposited powder electrodeposition film will be occurred at the edge portion of the coated article mainly due to the resolving action of the electrodeposition bath.

The inventors, having studied on the abovesaid method, have found that when the second half electrodeposition is carried out after reducing the volatile component mainly of water to a level of 15% by weight or less, the abovementioned drawbacks are completely solved out.

The coating material used in the present powder electrodeposition process comprises, as main ingredients, a water-thinnable cationic synthetic binder resin and a synthetic resin in the form of fine powder and may include other substances such as pigment and the like. Such binder resin and synthetic resin in the form of fine powder are dissolved or dispersed in water to give an aqueous electrodeposition bath. The fine powder (Po) and binder resin (B) are present in a Po/B ratio of about 5/1–0.5/1, preferably 3/1–1/1, by weight in the bath. The bath may contain about 10 to 20% of said main ingredients, together with water, certain amount of organic solvent and other additives such as, for example, pigment and the like. In carrying out the powder electrodeposition, the article to be coated (usually pretreated with zinc phosphate) is immersed in the bath, connected to a cathode, and a voltage is applied between the cathode (article to be coated) and anode to cause direct current flow through the bath. The electrodeposition is usually carried out under conditions of an applied voltage of 50–600 V, preferably 100–400 V, a bath temperature of 15°–35° C., preferably 20°–30° C., and a current flowing time of 10–180 seconds, preferably 20–60 seconds. They are, however, not of limitative sense but merely of illustration purpose, and the actual treating conditions may vary somewhat in a wider range depending on the desired film thickness, throwing power and the like.

The resinous powder used in the powder electrodeposition bath is prepared by kneading a known pigment into the following vehicle in a conventional way and pulverizing the same. As a vehicle, preference is given to an epoxy resin, to which any of the synthetic and natural resin as polyester resin, petroleum resin, phenol resin, butyral resin, styrene resin, xylene resin, ketone resin, melamine resin, urea resin, and rosin may be compounded in any proportion. As the epoxy resin, any of the material having the desired molecular weight, melting point and epoxy equivalent suitable for the preparation of the powder paint may be used. Among the commercial products there are Epikote produced by Shell Oil Co., Araldite produced by Ciba Ltd., Epichlon produced by Dainippon Ink Co., DER and DEN produced by Dow Chem. Co., and Sumiepoxy produced by Sumitomo Chem. Co.

As a hardening agent to be added to such epoxy resin, mention is given to an amine, amide derivative, acid anhydride, various isocyanates, isocyanurate, urea, melamine resin, amidine, imide and the like, and however, a blocked isocyanate derivative having no adverse effect on the film appearance and film properties is most preferable.

The resinous powder is prepared by mixing the abovesaid epoxy resin with other resin, hardening agent, pigment and other additives if necessary, making the pre-blend, pre-milling, thermal kneading, cooling and pulverizing the mixture. More desirably, the mixture is pulverized to fine grains with at least 20 microns or less size.

A water-thinnable cationic synthetic resin to be used as the binder, may be prepared by providing a primary or secondary amine adduct of the abovementioned epoxy resin, especially the epoxy resin having more than 2 epoxy groups per mole of the resin, and neutralizing the same with an acidic compound.

The epoxy resin used herein may be partially esterified with an aliphatic or aromatic monocarboxylic acid or such monocarboxylic acid as acrylic acid and metacrylic acid, partially etherified with phenols or may be an addition product with isocyanate. Examples of amine to be added are monoalkyl amines, dialkanolamines, alicyclic amines and polyamines. In either case, the amine has to be added in an amount sufficient enough to bring the whole resinous material including the epoxy resin and other resin to a stable, water-thinnable cationic synthetic resin. Amine adduct of the cationic resin is then neutralized to a desired extent with an organic or inorganic acidic compound such as, for example, acetic acid, formic acid, phosphoric acid, boric acid, citric acid, propionic acid and lactic acid to obtain a water-thinnable or water-soluble material. Thus obtained water-thinnable cationic synthetic resin is diluted with an appropriate amount of water and to this binder solution, the abovementioned powder resin is added and mixed well to give an aqueous suspension to be used as a powder electrodeposition bath. Certain amounts of organic solvent or additives may be added to assist suspension and stabilize the same.

In the second half electrodeposition, either anionic or cationic synthetic resin may be used and however, a cationic electrodeposition coating is much preferable because of better finish and wider operational allowance. The electrodeposition bath contains about 5 to 20% by weight of the cationic or anionic water-thinnable synthetic resin and pigment as main ingredients, and may further contain water, certain amounts of organic solvent, additives and neutralizer. In carrying out the electrodeposition, the bath is maintained at 15° to 35° C., preferably 20° to 30° C. and a voltage is applied between the cathode (article to be coated) and anode to cause direct current flow through the bath. The voltage applied is 100 to 600 V, preferably 100 to 400 V, and the treating time is 60 to 180 seconds, preferably 120 to 180 seconds. These figures may be freely changed depending on the desired film thickness, throwing power and the like. Excellent coated film with improved rust-resistance may be obtained with the film thickness (on dry basis) of 10 to 30 microns.

The synthetic resin to be used in the electrodeposition may be selected from the known cationic and anionic synthetic resins. As the anionic resin, such members as maleic oil series, polybutadiene, resin, epoxy ester resin, acrylic resin, phenol resin or mixture thereof may be used. As the cationic resin, such members as epoxy resin, epoxyurethane resin, acrylic resin, polyamide resin or mixture thereof may be used.

The abovesaid resin is used as a vehicle, and the electrodeposition bath is prepared by adding pigment, certain amounts of organic solvent, additives and neutralizer to the same.

According to the present invention, it is possible to eliminate various disadvantages in finishing liable to occur in the conventional wet-reverse coating system, i.e. surface roughness, popping, excessive deposition and the like. In an actual coating operation, number of articles with various shapes are usually treated under the same coating line. In this case, such important coating conditions as inter-electrode distance, electrode ratio and the like are to be varied with article to article, as a matter of course. Furthermore, the electrodeposition bath will be changed with time or by the inclusion of foreign substances, to the different condition. However, the present system can give considerable tolerance to the conditional changes, which is a very important characteristic feature of the present invention.

DESCRIPTION OF PREFERRED EMBODIMENTS

The invention shall be now explained in full in the following Examples. In these Examples, all parts and % are by weight unless otherwise being stated.

Preparation of Electrodeposition Bath (1) Electrodeposition bath containing a synthetic resin in the form of fine powder A mixture of 488 parts of Epikote 1001 (trade mark of epoxy resin manufactured by Shell Oil Co.), 105 parts of diethanolamine and 250 parts of isopropylalcohol is refluxed at 80° to 85° C. for 3 hours to obtain a liquid aminoepoxy resin (a water-thinnable cationic synthetic resin). Apart from this, 40 parts of Epikote 1004 (epoxy resin of Shell Oil Co.), 30 parts of Adduct B-1065 (Feba Co.), 29 parts of titanium oxide R-550 (Ishihara Sangyo) and 1 part of carbon black MA-100 (Mitsubishi Kasei) are kneaded in an extruder in a conventional way, pulverized by an impact type pulverizer into a powder mainly of epoxy resin having an average diameter of 7 microns.

143 parts of the abovementioned water-thinnable cationic synthetic resin are added with 6.2 parts of glacial acetic acid and 500 parts of deionized water, and the mixture is stirred for 10 minutes in a dissolver. Then 350 parts of the abovesaid fine powder are added thereto and the mixture is stirred well for 30 minutes in the dissolver and the diluted with deionized water until the solid content becomes 15% by weight. The characteristics of the electrodeposition bath are pH=5.2, Po/Bi=3.5/1.

(2) Cationic electrodeposition bath 336 parts of Epikote 1004, 143 parts of Epikote 1001, and 140 parts of ethylcellosolve are mixed together and stirring is continued until the whole ingredients are completely solved out. After heating to 50° C., a solution of 59 parts of diethanolamine and 20 parts of isopropyl alcohol is added while stirring over 1 hour thereto, and the mixture is maintained at 80° to 85° C. for 3 hours. Thereafter, a solution of 202 parts of Adduct B-1065 and 100 parts of ethylcellosolve is added over 30 minutes while stirring and the stirring is continued at the same temperature for 1.5 hour to obtain an amino-epoxyisocyanate resin. Using the abovesaid cationic resin, together with acetic acid as a neutralizer, titanium oxide as a pigment and carbon black, an aqueous electrodeposition bath is prepared according to a conventional way. The characteristics of the bath liquid are pH=5.4, ash content 25%, neutralization degree=75% and heating residue=13%.

(3) Anionic electrodeposition bath

According to a known procedure, an electrodeposition bath is prepared by using an anionic resin comprising polybutadiene resin, triethylamine (as a neutralizer), titanium oxide (as a pigment) and carbon black. The characteristics of the bath are pH=7.8, ash content=26% and heating residue=13%.

EXAMPLE 1

An automobile body member to be coated was pretreated with zinc phosphate (Bondelite No. 137 T), washed well with pure water and drain-dried at 150° C. Thus treated article was immersed into the abovesaid electrodeposition bath containing fine powder, as a cathode, and a voltage was applied between the cathode and anode to cause direct current flow through the bath. The electrodeposition conditions were: voltage 350 V; current applying time 30 seconds; interelectrode distance (minimum) 40 cm; and electrode ratio (facing pole area/total area of outer surface of the body member) about ½. After taking the body member up from the bath, it was washed well with water and 150 l of hot water were applied thereto as shower at a nozzle tip temperature of 80° C. Thus treated automobile body member was left stand for 5 minutes and thereafter immersed into the abovesaid cationic electrodeposition bath. The electrodeposition conditions were: voltage 250 V; current applying time 210 seconds, bath temperature 28° C.; interelectrode distance (minimum) 45 cm; and electrode ratio about 2. After removing from the bath, thus treated automobile body member was washed well with water, drain-dried at 80°-100° C. and baked at 190° C. for 20 minutes to complete the curing step.

COMPARATIVE EXAMPLE 1

The same procedures as stated in Example 1 were repeated except that the hot water spraying was omitted therefrom. The results obtained in Example 1 and in Comparative Example 1 are shown in the following Table 1.

Table 1

|  | Example 1 | Comparative Example 1 |
|---|---|---|
| Appearance and finish of the article excepting the boundary | good | some portions exceeding 80 microns thickness, popping and surface roughening |
| Finish of the boundary area | good no stepwise difference, no thinner portion | good no stepwise difference, and no thinner portion |
| Film thickness | outer surface 40-60 microns inner surface 45-20 microns | outer surface 45-90 microns inner surface 55-20 microns |

EXAMPLE 2

Figure 2:
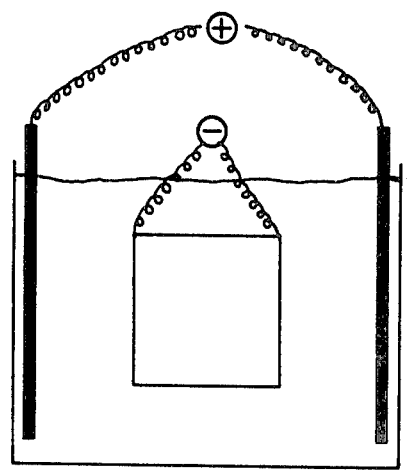
FIG. 2 is an electrodeposition bath containing the article of FIG. 1 immersed in the bath such that the described perforated surfaces are in contact with the electrodes shown therein.

To a box-type article having a perforate of 2 cm diameter going through a pair of opposite faces as shown in FIG. 1, was applied a pretreatment with zinc phosphate (Bondelite No. 137 T), and the treated article was washed well with pure water and drain-dried at 150° C. This was then placed in an electrodeposition bath as shown in FIG. 2 so that the perforated surfaces were against the electrodes. After conducting an electrodeposition as stated in Example 1 under conditions of 150 V, 25° C. and 20 seconds, this was washed with water and sprayed with a hot water at a nozzle tip temperature of 60° C. Thereafter, the treated article was dried at 80° C. for 7 minutes in an indirect hot air oven until the water content in the coated film reached to 9.7% (which was determined by the examination of resinous contents according to JIS standard in the film before and after drying at 110° C. for 3 hours). The dried article was then placed in the abovesaid anionic electrodeposition bath, as shown in FIG. 2, and electrodeposited under conditions of 250 V, 30° C. and 3 minutes, washed with water, drain-dried in air, and baked at 190° C. for 20 minutes in a drying oven. The results are shown in Table 2.

Table 2

| First half powder electrodeposition bath | Epoxy resin |
|---|---|
| Second half electrodeposition bath | Anionic resin |
| Drain-drying condition | 80° C. for 7 minutes |
| Water content in the coated film | 9.7% |
| Outer face appearance | Smooth, even and beautiful coating |
| Inner face appearance Boundary portion around perforate | No stepwise difference, uniform, continuous coating |
| Surfaces having no perforation | Anionic electrodeposition coating only |
| Film thickness Outer surface Inner surface | 65-71 microns 26 microns |

What we claim is:

1. In a process for coating an article comprising subjecting the article to a powder electrodeposition in a bath containing a water-thinnable cationic synthetic resin and a synthetic resin in the form of fine powder, subsequently, without hardening the formed coating, to an additional electrodeposition in a bath containing an ionic synthetic resin, and baking thus formed coatings to cause to crosslink and harden themselves, an improvement which is characterized by that a hot water of more than 50° C. is sprayed onto the coated film after finishing the first half powder electrodeposition, but before conducting the second half electrodeposition.

2. A process according to claim 1 wherein the coated film is, after finishing the hot water spraying and before subjecting to the second half electrodeposition, treated to evaporate the volatile component contained off to the level of less than 15% by weight.

* * * * *